(12) United States Patent
Blair

(10) Patent No.: US 6,588,559 B2
(45) Date of Patent: Jul. 8, 2003

(54) TWO-WAY CLUTCH BIASING ASSEMBLY

(75) Inventor: Christopher E. Blair, Waterford, MI (US)

(73) Assignee: BorgWarner, Inc., Auburn Hills, MI (US)

(*) Notice: Subject to any disclaimer, the term of this patent is extended or adjusted under 35 U.S.C. 154(b) by 0 days.

(21) Appl. No.: 09/954,844

(22) Filed: Sep. 18, 2001

(65) Prior Publication Data

US 2003/0051959 A1 Mar. 20, 2003

(51) Int. Cl.$^7$ .......................... F16D 15/00; B60K 23/08
(52) U.S. Cl. .......................... 192/20; 192/35; 192/38; 180/249
(58) Field of Search .............................. 192/20, 35, 38, 192/44; 475/324; 180/249

(56) References Cited

U.S. PATENT DOCUMENTS

| | | |
|---|---|---|
| 1,831,955 A | 11/1931 | Harney |
| 2,173,044 A | 9/1939 | Ruggles et al. ............... 180/44 |
| 2,290,089 A | 7/1942 | Bock ........................... 180/49 |

(List continued on next page.)

FOREIGN PATENT DOCUMENTS

| | | |
|---|---|---|
| DE | 871 857 | 3/1953 |
| DE | 31 18 565 A1 | 11/1982 |
| DE | 31 49 880 C2 | 7/1985 |
| DE | 35 26 630 A1 | 2/1987 |
| DE | 35 32 759 C1 | 3/1987 |
| DE | 40 35 686 C1 | 1/1992 |
| DE | G 91 14 528.7 | 3/1992 |
| DE | 43 32 466 C2 | 2/1998 |
| DE | 195 02 617 C2 | 9/1998 |
| DE | 199 06 980.8 | 2/1999 |
| EP | 0 172 006 A2 | 2/1986 |
| EP | 0 762 009 A1 | 3/1997 |
| EP | 0 848 179 A1 | 6/1998 |
| FR | 1575044 | 7/1969 |
| FR | 2123828 | 9/1972 |
| GB | 2 036 203 A | 6/1980 |
| WO | WO 97/32678 | 9/1997 |
| WO | WO 99/45289 | 9/1999 |

OTHER PUBLICATIONS

"The Two–Mass Flywheel—A Torsional Vibration Damper for the Power Train of Passanger Cars—State of the Art and Further Technical Development," Arno Sebulke; Bayerische Motoren Werke AG (BMW), Feb. 1987, pp. 1–10.

Der Neue Ford 2, 3–1–Motor mit Ausgleichswellen, Heuser et al., Motortechnische Zeitschrift Jan. 1997, pp 10–14.

Das Porshe–Doppelkupplungs–(PDK–) Getriebe (The Porshe Dual Clutch Transmission) Flegl et al., Automobiltechnische Zeitschrift 89 (1987) 9, pp 439–452.

Primary Examiner—Richard M. Lorence
(74) Attorney, Agent, or Firm—Bliss McGlynn, P.C.; Greg Dziegielewski

(57) ABSTRACT

A two-way clutch biasing assembly including a two-way clutch having an inner race attached to an input shaft and an outer race attached to an output shaft. The inner and outer races having inner cammed portions between them, with an engagement assembly interposed therein that is adapted to rotate bi-directionally thereby providing selective mechanical engagement between the races in either direction. A planetary gear assembly is provided having a ring gear, planetary gears on a carrier, and a sun gear that is adapted to rotate the engagement assembly within the two-way clutch. A drag clutch assembly is also slidingly connected to the carrier to hold the carrier stationary when the input shaft is stationary, such that sun gear is rotated by the plurality of planetary gears, thereby rotating the engagement assembly within the two-way clutch and providing a mechanical advantage in engaging the races together when the input shaft begins to move.

11 Claims, 7 Drawing Sheets

U.S. PATENT DOCUMENTS

| | | | |
|---|---|---|---|
| 2,551,939 A | 5/1951 | Gerst | 192/48 |
| 2,687,198 A | 8/1954 | Greenlee | 192/113 |
| 2,712,373 A | 7/1955 | Smirl | 192/103 |
| 2,887,201 A | 5/1959 | Willis | 192/67 |
| 2,893,256 A | 7/1959 | Wargo | 74/370 |
| 2,906,383 A | 9/1959 | Gabriel | 192/85 |
| 2,946,238 A | 7/1960 | Beyerstedt | 74/665 |
| 2,969,134 A | 1/1961 | Wiedmann et al. | 192/84 |
| 3,047,115 A | 7/1962 | Lee et al. | 192/85 |
| 3,394,631 A | 7/1968 | Thompson | 92/46 |
| 3,481,436 A * | 12/1969 | Wilkowski et al. | 192/35 |
| 3,490,312 A | 1/1970 | Seitz et al. | 74/711 |
| 3,517,573 A * | 6/1970 | Roper | 475/232 |
| 3,534,842 A | 10/1970 | Davison, Jr. | 192/113 |
| 3,589,483 A | 6/1971 | Smith | 192/3.52 |
| 3,596,537 A | 8/1971 | Koivunen | 74/759 |
| 3,610,380 A | 10/1971 | Montalvo, III | 192/85 |
| 3,612,237 A | 10/1971 | Honda | 192/85 |
| 3,631,741 A * | 1/1972 | Kelbel | 475/312 |
| 3,654,692 A | 4/1972 | Goetz | 29/558 |
| 3,765,519 A | 10/1973 | Kell | 188/366 |
| 3,834,503 A | 9/1974 | Maurer et al. | 192/113 |
| 3,848,518 A | 11/1974 | Martin | 92/107 |
| 3,910,131 A | 10/1975 | Richards | 74/331 |
| 4,114,478 A * | 9/1978 | Clauss | 475/144 |
| 4,205,739 A | 6/1980 | Shelby et al. | 192/113 |
| 4,219,246 A | 8/1980 | Ladin | 308/219 |
| 4,270,647 A | 6/1981 | Leber | 192/113 |
| 4,301,904 A | 11/1981 | Ahlen | 192/70.12 |
| 4,361,217 A | 11/1982 | Bieber et al. | 192/103 |
| 4,372,434 A | 2/1983 | Aschauer | 192/85 |
| 4,381,828 A | 5/1983 | Lunn et al. | 180/247 |
| 4,407,387 A | 10/1983 | Lindbert | 180/247 |
| 4,501,676 A | 2/1985 | Moorhouse | 252/12 |
| 4,640,478 A | 2/1987 | Leigh-Monstevens | 248/27.1 |
| 4,664,217 A | 5/1987 | Welch et al. | 180/247 |
| 4,667,534 A | 5/1987 | Kataoka | 74/711 |
| 4,667,798 A | 5/1987 | Sailer et al. | 192/70.12 |
| 4,700,823 A | 10/1987 | Winckler | 192/107 |
| 4,713,980 A | 12/1987 | Ida et al. | 74/467 |
| 4,718,303 A | 1/1988 | Fogelberg | 74/710.5 |
| 4,732,253 A | 3/1988 | Hiramatsu et al. | 192/87.11 |
| 4,733,762 A | 3/1988 | Gay et al. | 192/98 |
| 4,808,015 A | 2/1989 | Babcock | 384/609 |
| 4,813,524 A | 3/1989 | Reik | 192/106.2 |
| 4,827,784 A | 5/1989 | Muller et al. | 74/330 |
| 4,828,070 A | 5/1989 | Maramatsu | 180/247 |
| 4,841,803 A | 6/1989 | Hamano et al. | 74/665 |
| 4,856,635 A | 8/1989 | Vlamakis | 192/70.12 |
| 5,045,036 A | 9/1991 | Reuter et al. | 475/149 |
| 5,107,972 A | 4/1992 | Sundquist | 192/35 |
| 5,150,637 A | 9/1992 | Ninomiya et al. | 74/335 |
| 5,152,726 A | 10/1992 | Lederman | 475/324 |
| 5,174,420 A | 12/1992 | DeWald et al. | 188/264 |
| 5,267,807 A | 12/1993 | Biedermann et al. | 403/375 |
| 5,305,863 A | 4/1994 | Gooch et al. | 192/70.12 |
| 5,332,060 A | 7/1994 | Sperduti et al. | 180/197 |
| 5,346,442 A | 9/1994 | Eastman | 475/223 |
| 5,355,981 A * | 10/1994 | Itoh et al. | 192/35 |
| 5,407,024 A | 4/1995 | Watson et al. | 180/248 |
| 5,423,405 A | 6/1995 | Fukaya | 192/98 |
| 5,466,195 A | 11/1995 | Nogle et al. | 475/55 |
| 5,469,943 A | 11/1995 | Hill et al. | 188/264 |
| 5,495,927 A | 3/1996 | Samie et al. | 192/70.12 |
| 5,520,272 A | 5/1996 | Ewer et al. | 192/36 |
| 5,538,121 A | 7/1996 | Hering | 192/70.12 |
| 5,577,588 A | 11/1996 | Raszkowski | 192/113.35 |
| 5,584,776 A | 12/1996 | Weilant et al. | 475/213 |
| 5,613,588 A | 3/1997 | Vu | 192/113.35 |
| 5,643,129 A | 7/1997 | Richardson | 475/204 |
| 5,653,322 A | 8/1997 | Vasa et al. | 192/85 |
| 5,662,198 A | 9/1997 | Kojima et al. | 192/87.11 |
| 5,680,308 A | 10/1997 | Warren | 364/424.098 |
| 5,699,870 A | 12/1997 | Warren | 180/247 |
| 5,704,867 A | 1/1998 | Bowen | 475/221 |
| 5,711,409 A | 1/1998 | Murata | 192/87.11 |
| 5,755,314 A | 5/1998 | Kanda et al. | 192/70.12 |
| 5,771,477 A | 6/1998 | Showalter et al. | 701/51 |
| 5,833,566 A | 11/1998 | Showalter | 475/198 |
| 5,867,092 A | 2/1999 | Vogt | 340/456 |
| 5,893,812 A | 4/1999 | Narai et al. | 475/86 |
| 5,899,310 A | 5/1999 | Mizuta | 192/107 |
| 5,918,715 A | 7/1999 | Ruth et al. | 192/46 |
| 5,992,592 A | 11/1999 | Showalter | 192/43.1 |
| 6,062,361 A | 5/2000 | Showalter | 192/38 |
| 6,149,543 A * | 11/2000 | Breen | 475/269 |
| 6,155,395 A | 12/2000 | Braford, Jr. | 192/48.3 |
| 6,244,407 B1 | 6/2001 | Kremer et al. | 192/70.12 |
| 6,251,045 B1 | 6/2001 | Oliveira et al. | 477/124 |

* cited by examiner

TWO-WAY CLUTCH BIASING ASSEMBLY

FIELD OF THE INVENTION

The present invention relates generally to a biasing device used with a two-way clutch assembly and, more specifically, to an apparatus for providing a biasing assembly for use with a two-way clutch assembly within a vehicle transfer case, which decreases the mechanical backlash that occurs during a counter-rotational engagement within the two-way clutch assembly.

DESCRIPTION OF THE RELATED ART

Transfer cases are used in full and part-time, four-wheel drive vehicles to distribute driving power received through an input shaft from the vehicle's transmission to a pair of output drive shafts. One of the drive shafts powers the vehicle's front wheels and the other of the drive shafts powers the vehicle's rear wheels. In vehicles that permit shifting between two-wheel drive (hereafter 2WD) and four-wheel drive (hereafter 4WD) modes, the input shaft of the transfer case provides continuous drive power to one of its output shafts and selectively provides drive power to the other output shaft via some type of disengageable or otherwise adjustable coupling, such as a viscous coupling, electromagnetic clutch, or positionable spur gearing. Other drive modes are sometimes provided, including 4WD high (4H) for higher 4WD speeds, 4WD low (4L) for lower 4WD speeds, neutral for disengaging the transmission from the front and rear axles to allow towing, and locked 4WD for controlling wheel slippage.

Additionally, other transfer case applications have evolved, such as "on-demand 4WD", in which a transfer case, with its related parts that provide 4WD, is installed in the vehicle, yet 4WD mode is only engaged, by automatic means, when there is a loss of 2WD traction. Full-time, or constant, 4WD mode, sometimes referred to as "all-wheel drive" is also currently available in some automotive variants. In this mode, 4WD is not deselectable and remains a fixed configuration.

In the transfer cases used for these vehicles, certain elements, or components, are required to transmit the driving force. More particularly, certain elements are required to selectively transmit the driving force during particular driving situations and not in others. One example of a device used to selectively transmit driving, or rotational force, in a transfer case is a one-way clutch. One-way clutches are known devices having inner and outer races with an engagement mechanism interposed therebetween. Generally speaking, the engagement mechanism is designed to lock the races together when the relative rotation of the races is in one particular rotational direction. When the races rotate in the opposite relative direction, the engagement mechanism is unlocked and the races have free rotation relative to each other. In application, when the races are fixed to concentric shafts, the one-way clutch will function to hold the shafts together when engaged, causing them to rotate in the same direction and thereby transferring motive force, or drive torque, from one shaft to the other. When the one-way clutch is disengaged, the shafts thereby freewheel relative to each other.

Specific applications govern how the one-way clutch engagement is designed. A one-way clutch may be designed to have one race as the driving member and one as the driven member, or the clutch may be designed to allow either shaft to act as the driving member during different operating modes. In this manner, the locking mechanism of the one-way clutch may be designed to engage in response to the rotation of only one of the races or the clutch may be designed as to engage if either race provides the proper relative rotation.

The one-way clutch is typically used in circumstances in which shaft to shaft, or shaft to race, rotational, torque-transferring engagements are desirable but a "hard" connection, such as a spline or keyed connection, would not work. For example, during certain operating parameters, a 4WD vehicle experiences driveline difficulties that arise from having the front and rear wheels cooperatively driven, which can be alleviated by the use of these one-way clutch devices within the transfer case. When a 4WD vehicle turns a tight corner with the four wheels coupled together on a paved road, the vehicle may experience what is known as "tight corner braking effect". This happens due to the inherent physical geometry that affects objects rotating at different radial distances from a center point. Two distinct effects generally occur with 4WD vehicles. First, when any vehicle enters a curve, the wheels on the outside of the curve must traverse a greater circumferential distance than the wheels on the inside of the curve due to the greater radial distance from the center of the curve. The tighter the curve, the greater the difference in the rate of rotational, angular speed between the inner wheels and the outer wheels. Therefore, in a curve the outside wheels must rotate faster than the inner wheels. This is effect is exaggerated in a 4WD vehicle but is generally countered by the vehicle's differential assemblies installed at the front and rear axles. Secondly, since the front wheels are also leading the vehicle through the curve, they must rotate faster than the rear wheels. With a solid 4WD engagement there is no device (such as a differential) to counter this action and the slower moving rear wheels act in an undesirable braking manner.

To solve this problem, one-way clutches have been employed in the transfer case so that as the vehicle beings turning a corner, the front wheels (connected to the transfer case output shaft through a one-way clutch) are allowed to disengage and freewheel faster than the rear wheels. Specifically, the driven shaft of the one-way clutch (i.e., the output shaft to the 4WD front wheels) begins turning faster than the input, or driving, shaft and the one-way clutch's locking mechanism disengages allowing freewheeling of the output shaft relative to the input shaft. This momentarily takes the transfer case out of 4WD and prevents the tight corner braking effect.

Another undesirable 4WD driving effect happens during engine braking. This occurs in a manual transmission 4WD vehicle when in 4WD and coasting. The manual transmission maintains the physical connection to the vehicle's engine, such that when the vehicle is allowed to coast, the engine places a decelerating, or braking, force on the transfer case, both the input shaft and output shafts, and ultimately on both the front and rear wheels. The normal, and undesirable, parasitic effect of engine braking though the rear wheels of a manual transmission 2WD vehicle has a negative impact on fuel consumption and efficiency, which is greatly increased in the case of the 4WD vehicle by adding in the front wheels as well. In this instance, when a one-way clutch is used in the driveline of the transfer case, the slowing of the input shaft through the engine braking effect allows the output shaft (which is connected to the front wheels) to disengage and freewheel, momentarily taking the transfer case out of 4WD and preventing the engine braking effect from passing to the front wheels, thereby reducing the negative impact on fuel efficiency.

Finally, in an on-demand application, a one-way clutch can be employed in the transfer case so that in the normal 2WD mode, if one of the rear wheels should slip during vehicle acceleration, the rotating speed of the input shaft will increase, so that the one-way clutch engaging elements will bring the transfer case into 4WD and the front wheels into a driven mode.

While proving to be of great value, as transfer case design technology utilizing one-way clutches continued to evolve, the one-way clutch designs began to reveal certain limitations. Most importantly, while a one-way clutch would solve the above-mentioned problems and disadvantages, the one-way clutch would only work, by itself, in one direction. In other words, the one-way rotational engagement between the input and output shafts in the transfer case would allow forward 4WD movement but not reverse 4WD movement. To provide this function, additional mechanisms and devices were added to the transfer case to supplement the one-way clutches. However, this added weight and complexity to the transfer case.

The concurrent on-going design goals of reducing the mechanical complexity and physical bulk of transfer cases while increasing their functionally brought about the design of another torque transmitting device that adapted the one-way clutch mechanism to allow engagement in a bi-rotational or two-way manner. This device is typically known as a two-way clutch. The two-way clutch is desirable to solve all the above difficulties with 4WD and provide full forward and reverse functionality. It allows the input shaft to be designed as the driving member for 4WD modes, in both rotational directions, but offers bi-directional freewheel movement of the driven output shaft as needed when the input shaft is stationary or rotating slower than the output shaft.

Yet, even though the conventional two-way clutch design has been very useful in solving these and other 4WD driving difficulties, it has become apparent in applications that use a two-way clutch for 4WD engagement that certain deficiencies still exist which cause particular problems. Specifically, there exists a physical angular distance from the engaged interconnection between the races of the two-way clutch from a first rotational direction to the engagement of the races in the reverse, or second direction. This angular distance, also known as backlash, can cause mechanical problems as the two-way clutch is repeatedly called on to change its driving rotational direction over the service life of the transfer case. This is due to the mechanical load brought to bear in the switch from one rotational direction to the other. This rotational shift takes the form of a high-impact shock loading that is not only absorbed by the two-way clutch but is also translated to the other components attached to the two-way clutch in the driveline, all to a repetitive detrimental effect. This shock loading is detrimental as it reduces component life and reliability, while adding unpleasant ride characteristics to the vehicle.

Some attempts have been made to reduce the amount of backlash within a two-way clutch assembly but these have generally required substantial, or radical, redesigns of the transfer case structure. In the typical two-way clutch currently used, the structurally inherent backlash can only be physically reduced to between 4 and 5 degrees of rotation. Even this seemingly small amount of backlash causes the problems mentioned above.

Therefore, there exists a need to create an improved, two-way clutch assembly for use as a driveline component within a transfer case that has a reduced, or minimal, backlash, which will thereby reduce impact loading, extend the life of the clutch and associated components, and improve the ride characteristics of the vehicle.

SUMMARY OF THE INVENTION AND ADVANTAGES

The present invention overcomes these deficiencies in the related art in a biasing device used with a two-way clutch assembly and, more specifically, in an apparatus for providing a biasing assembly for use with a two-way clutch assembly within the case of a vehicle transfer case that decreases the mechanical backlash that occurs during a counter-rotational engagement within the two-way clutch assembly.

Specifically, the present invention provides a two-way clutch biasing assembly that includes a two-way clutch having an inner race operatively attached to an input shaft and an outer race operatively attached to an output shaft. An engagement assembly is operatively interposed between the inner and outer races and is adapted to rotate bi-directionally thereby providing mechanical engagement between the races. The present invention also includes a planetary gear assembly having a ring gear, a plurality of planetary gears operatively connected to a carrier, and a sun gear that is operatively connected to the engagement assembly. The planetary gear assembly is adapted to operatively rotate the engagement assembly within the two-way clutch. Also, a drag clutch assembly is operatively connected to the carrier to provide a mechanical force to hold the carrier stationary when the input shaft is stationary, such that the sun gear is rotated by the plurality of planetary gears, thereby rotating the engagement assembly between the races of the two-way clutch and mechanically engaging the races together when the input shaft begins to move.

The present invention thereby overcomes the disadvantages and drawbacks of the current art by decreasing the mechanical backlash found in conventional devices by providing an assembly that has a mechanical advantage, which acts as a speed multiplier, allowing the two-way clutch engagement mechanism to traverse the angular displacement between the two engagement regions of the two-way clutch assembly at a rate several times faster than would possible by the mechanism itself.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
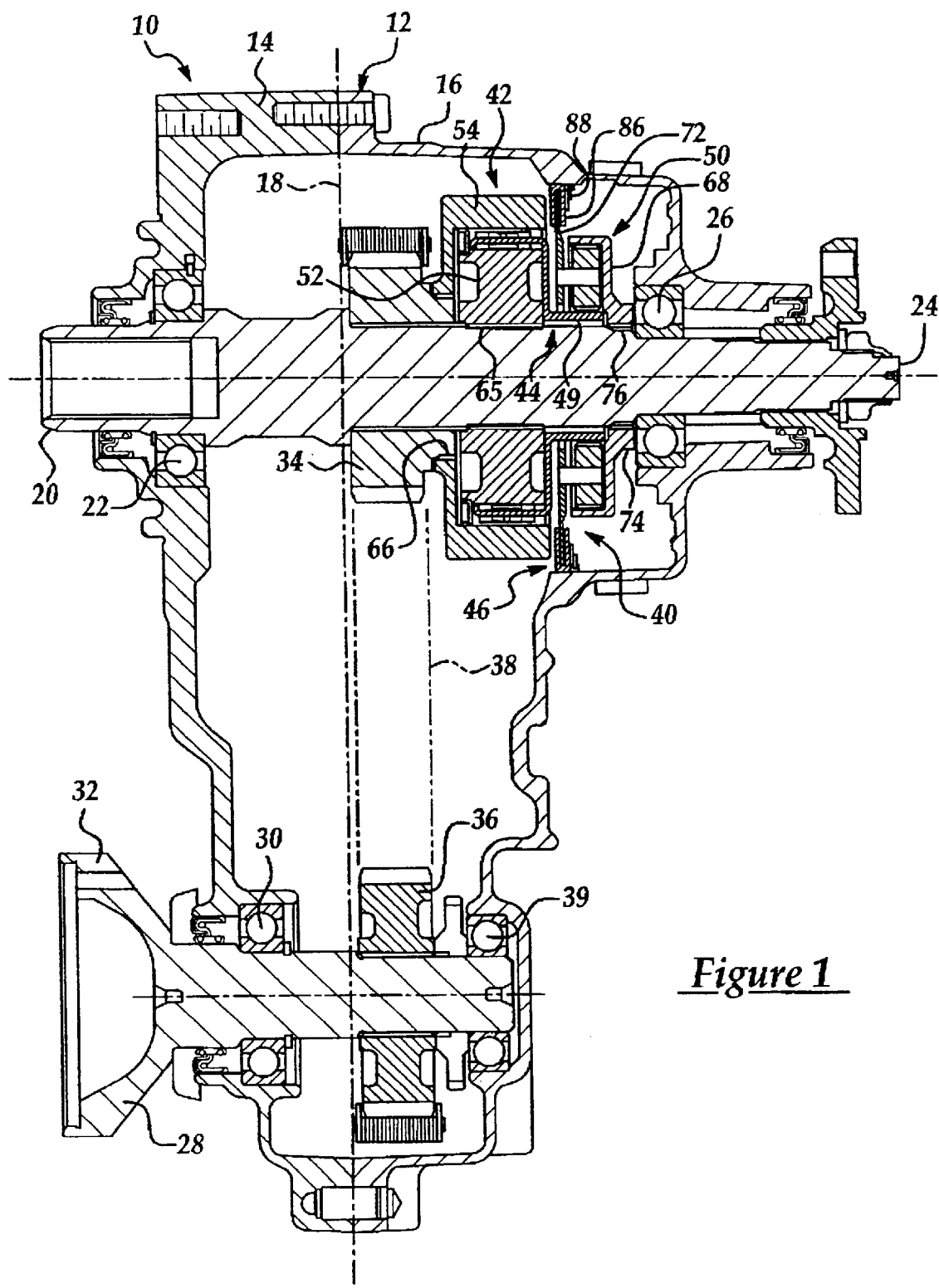
FIG. 1 is a cross-sectional view of a transfer case having a two-way clutch biasing assembly of the present invention utilizing a planetary gear assembly.

A transfer case utilized in a 4WD vehicle and incorporating the present invention is schematically illustrated in FIG. 1 and generally indicated at 10 where like numerals are employed to designate like structure throughout the figures. The transfer case 10 includes a housing 12 which is formed by a case 14 and a cover 16 which mate along a centerline 18 in a conventional manner. An input shaft 20 is rotatably supported via input roller bearings 22 in the case 14 and is operatively coupled to the output of a transmission in a conventional manner. Similarly, a primary output shaft 24 is rotatably supported via rear output roller bearings 26 in the cover 16 in a conventional manner. It is noted that, as depicted in the drawing, the input and output shafts are integral, but those having ordinary skill in the art will appreciate that they may be formed of two shafts splined together in a conventional manner. Together, the input and output shafts define the "main" shaft of the transfer case.

In addition, the transfer case 10 of the present invention includes a secondary output shaft 28 rotatably supported at the lower portion of the housing 12 via front output roller bearings 30. The secondary output shaft 28 has a bell-shaped flange 32 which is operatively coupled to a ball joint (not shown) to transmit torque to the front wheels of the vehicle when it is in four-wheel drive mode as is conventionally known in the art. A drive sprocket 34 is splined to the primary output shaft 24 and rotates therewith in the upper portion of the housing 12. The drive sprocket 34 is operatively coupled to a lower driven sprocket 36 via a chain 38 shown in phantom. The lower driven sprocket 36 is rotatably supported in the lower portion of the housing 12 via rear roller bearings 39 to selectively transmit torque to the secondary output shaft 28. The one speed transfer case 10 described up to this point is conventional in the art.

Figure 2:
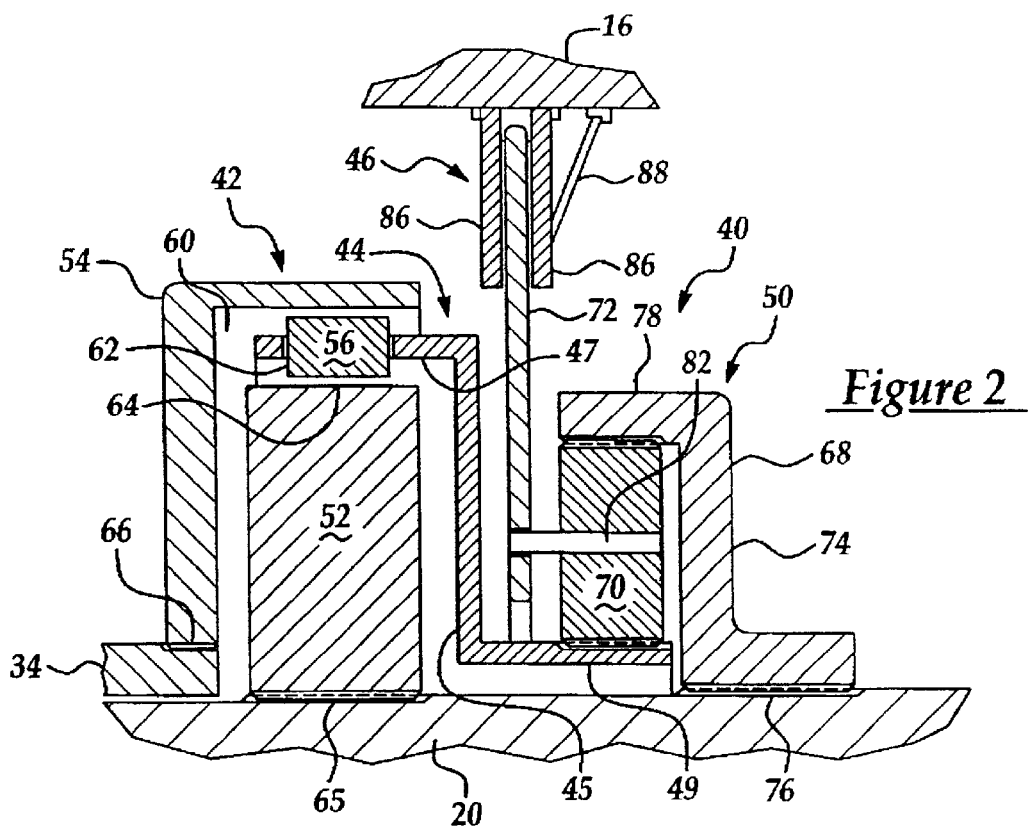
FIG. 2 is a simplified schematic view of a two-way clutch biasing assembly of the present invention utilizing a planetary gear assembly.
Figure 6:
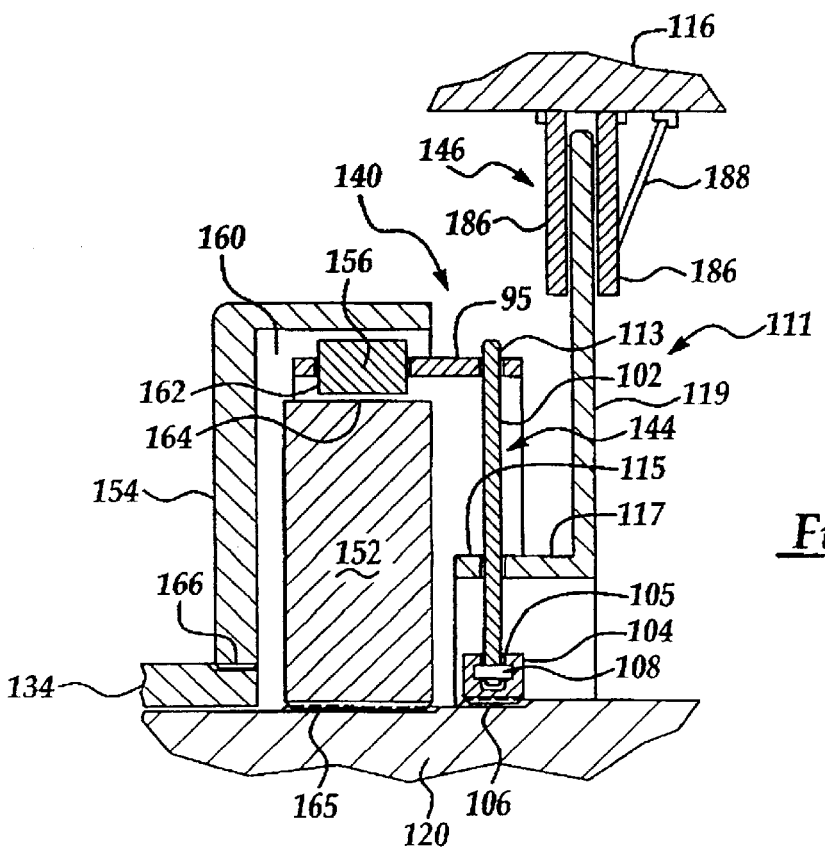
FIG. 6 is a simplified schematic view of a two-way clutch biasing assembly of the present invention utilizing a lever arm actuating arrangement.
Figure 4:
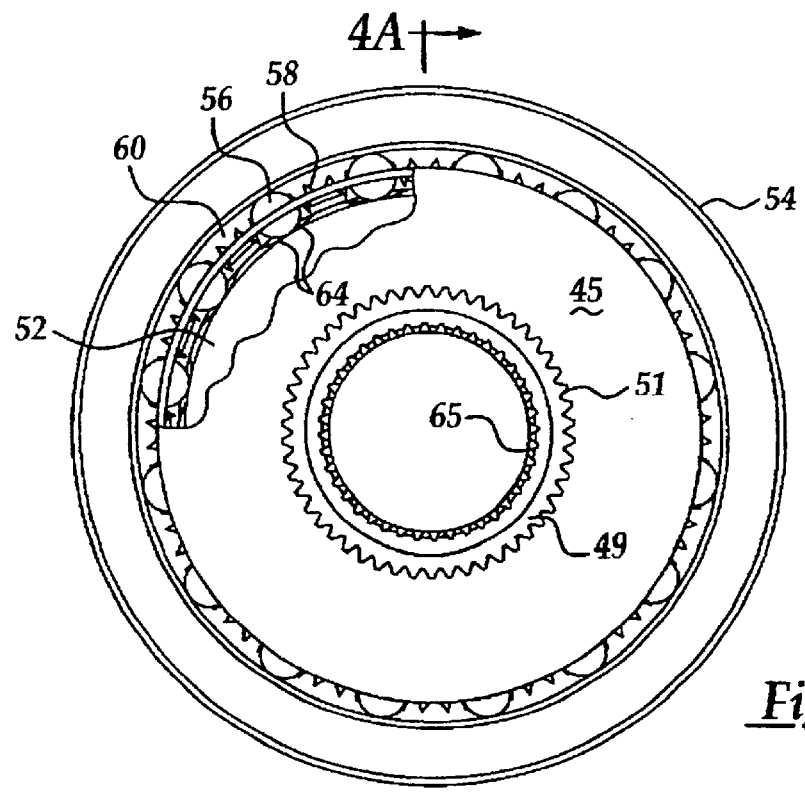
FIG. 4 is an end view of a two-way clutch of the present invention to be used in a two-way clutch biasing assembly with a planetary gear assembly.
Figure 4A:
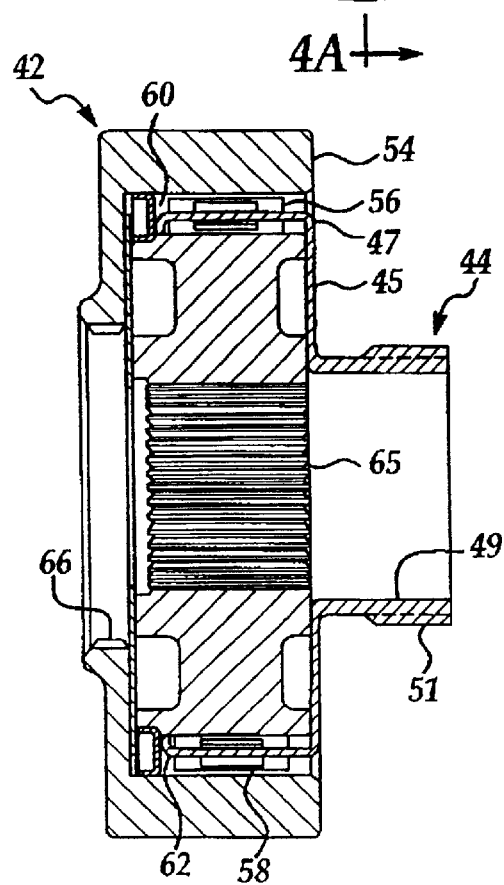
FIG. 4A is a partial cross-sectional view of a two-way clutch of the present invention to be used in a two-way clutch biasing assembly with a planetary gear assembly, taken substantially along lines 4A—4A of FIG. 4.

In reference to the present invention, FIG. 1 shows a two-way clutch biasing assembly of the present invention, generally indicated at 40. As in the simplified schematic of FIG. 2, the two-way clutch biasing assembly 40 of the present invention includes a two-way clutch assembly generally indicated at 42, a roller cage engagement assembly generally indicated at 44, a drag clutch assembly generally indicated at 46, and a planetary gear set assembly generally indicated at 50. As best illustrated in FIGS. 4 and 4A, the two-way clutch assembly 42 is of a roller type, which includes an inner race 52, an outer race 54, and the roller cage engagement assembly 44. The inner race 52 is disposed within the outer race 54 and a circumferential gap 60 is created between the two.

Figure 3:
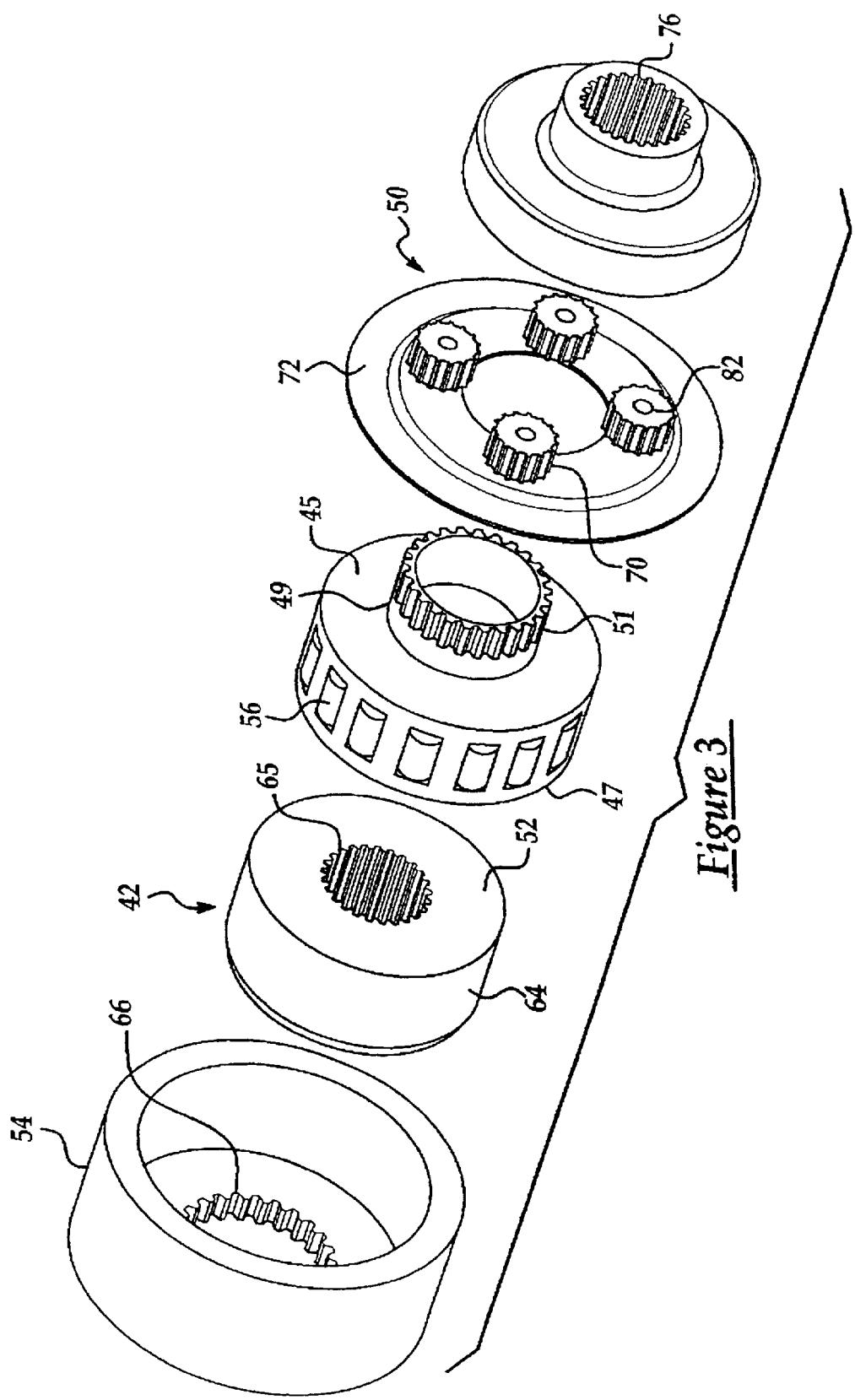
FIG. 3 is an exploded view of a two-way clutch biasing assembly of the present invention utilizing a planetary gear assembly.

As also shown in the exploded view of FIG. 3, the roller cage engagement assembly 44 is formed as a large and a small annular ring with an attached circular main body 45 and generally forms the shape of an open cup. The larger annular ring portion forms the roller retainer portion 47. The center of the main body 45 is open and the smaller annular ring extends laterally, opposite to the roller retainer portion 47. A plurality of gear teeth 51 are disposed about the outside circumference of the small annular ring to form the sun gear 49. The roller retainer portion 47 of the roller cage engagement assembly 44 includes a plurality of rollers 56 and a plurality of spring retainers 58. The roller retainer portion 47 is interposed in the circumferential gap 60 that is formed between the outer diameter of the inner race 52 and the inner diameter of the outer race 54. The roller retainer portion 47 also includes a plurality of longitudinally formed roller openings 62 disposed about its circumference. Each one of the plurality of rollers 56 are operatively disposed within each one of the roller openings 62 with each one of the plurality of spring retainers 58 operatively disposed between the rollers 56. The spring retainers 58 provide an equalizing spring pressure between each of the rollers 56, causing the rollers 56 to be equilaterally spaced within the plurality of roller openings 62. In this manner, the rollers 56 are free to rotate as they rest between the inner and outer races 52 and 54 but are "caged' within the roller cage engagement assembly 44 and are spaced in a free-floating manner by the spring retainers 58.

Referring to FIG. 4, the inner race 52 has ramped, or cammed, portions 64 on its outer diameter, which narrows the circumferential gap 60 on either side of each of the rollers 56. This allows the rollers 56, in the manner of a conventional two-way clutch, to roll up and engage themselves, in a wedging or jamming manner, between the cammed portions 64 and the inner diameter of the outer race 54 when the rotation of the races 52, 54 would cause them to do so. In this manner, the rollers 56 serve to lock the races 52, 54 together as the rollers 56 are caused to move into the narrowing spaces, provided by the cammed portions 64, between the races. When the races 52, 54 are not acted upon to be locked together, the spring retainers 58 function to center the plurality of rollers 56 in a median freewheel position between the cammed portions 64.

The inner race 52 is operatively connected, by a splined engagement, to the input shaft 20 at 65. The outer race 54 is operatively coupled, by a splined engagement, to a portion of the drive sprocket 34 at 66. It should be appreciated that the cammed portions of the two-way clutch may be of differing embodiments (i.e. on the outer race, or on both races) without departing from the scope of the claimed invention.

As shown in FIGS. 2, 3, 4 and 4A, the planetary gear set assembly 50 includes a ring gear housing 68 and a plurality of planetary gears 70 within a carrier 72. The ring gear housing 68 is generally comprised of an annular ring attached to a base portion generally forming an open cup shape. The base portion 74 has an open center and is operatively connected to the input shaft 20 by a splined engagement at 76. The annular ring portion 78 of the ring gear housing 68 has an internal gear surface 80, which meshingly engages the gear teeth disposed on the plurality of planetary gears 70 that are operatively disposed within the ring gear housing 50. The planetary gear set assembly 50 is placed in close proximity to the two-way clutch 42 such that the sun gear 49 of the roller cage engagement assembly 44 is insertedly disposed within the planetary gear set assembly 50 and the plurality of planetary gears 70 also operatively mesh with the gear teeth 51 that are disposed about the sun gear 49. In this manner, the planetary gears 70 are interposed in meshing engagement between the ring gear housing 68 of the planetary gear set assembly 50 and the sun gear 49 of the roller cage engagement assembly 44. The planetary gears 70 are further operatively disposed upon pinions 82, the pinions 82 being fixedly disposed on the carrier 72. The carrier 72 extends radially outwardly in a disk shape from the planetary gear set assembly 50 and slidingly engages the drag clutch assembly 46.

The drag clutch assembly 46 is composed of two friction plates 86 and a Belleville tensioning spring 88. The friction plates 86 are a pair of circular rings attached to the housing 12 of the transfer case, having the outer edge of the surface of the carrier 72 set operatively between them. The Belleville spring 88 provides tension to the friction plates 86 and thereby provides rotational drag on the carrier 72.

The biasing assembly 40 of the present invention operates in two modes. In the first mode (as best shown in simplified FIG. 2), the locked and engaged mode of operation, the input shaft 20 rotates and the rollers 56 wedge in the cammed portion 64 of the inner race 52, locking the races 52, 54 together in a combined rotation and causing the drive sprocket 34 to concomitantly rotate through the splined connection at 66. The sun gear portion 49 of the roller cage engagement assembly 44 and the ring housing 68 of the planetary gear set assembly 50 are traveling at the same rotational speed, thus the planetary gears 70 are stationary within the gear set 50 causing the carrier 72 to also travel at that speed. As such, the drag clutch assembly 46 is allowing the carrier to rotationally slip while providing a drag force to the carrier 72. If the input shaft 20 has cause to slow or stop, the rollers 56 will back out of the cammed portions 64 to a neutral position that allows the races 52, 54 to unlock and the drive sprocket 34 to freewheel. When the input shaft 20 speeds up faster than the outer race 54 and the drive sprocket 34, the rollers 56 will re-engage the cammed portions 64. In this manner, the two-way clutch 42 avoids the engine braking effect previously discussed.

The second operational mode of the biasing assembly 40 of the present invention is the transient, or translational mode. When the vehicle is in 4WD and reverse is selected by the operator, the transfer case 10 will reverse the rotation of the input and output shafts, which must also translate to a reversal of the front wheel driveline components in the transfer case 10. Therefore, the two-way clutch must move from an engagement in its forward rotational direction to an engagement in the reverse (or opposite) rotational direction. The biasing assembly 40 of the present invention acts as a speed multiplier to move the roller cage engagement assembly 44 from the locked position of the first rotational direction to the locked position of the opposite rotational direction at a higher rate of speed than would be possible unassisted to reduce the mechanical backlash of the two-way clutch 42. This is accomplished in the following progression: first, as the vehicle is shifted out of the forward gear, the transfer case input shaft 20 stops allowing the rollers 56 to move slightly back out of their wedged engagement between the races 52, 54. By this action of the two-way clutch 42, the drive sprocket 34 (and the associated front wheel driveline components) may freewheel. At this point, since there is no torque being transferred from the inner race 52 to the outer race 54, the friction loading of the Belleville spring 88 causes the drag clutch assembly 46 to hold and lock the carrier 72 in place. Next, as the input shaft 20 begins to counter-rotate (reverse), the ring gear housing 68 also rotates by its splined connection to the input shaft 20 at 76.

The rotation of the ring gear housing 68 causes the planetary gears 70 to rotate on their pinions 82 on the now stationary carrier 72. The rotation of the planetary gears 70 on their pinions 82 of the stationary carrier 72 causes the rotation to be transferred to the gear teeth 51 of the sun gear 49. The rotation of the sun gear 49, being formed as part of the roller cage engagement assembly 44, rotates the roller cage engagement assembly 44 within the races 52, 54 of the two-way clutch 42.

Importantly, the gear ratio of the planetary gear set assembly 50 and the roller cage engagement assembly 44 forms an inherent angular mechanical advantage. This mechanical advantage operates as a speed multiplier in regards to the rotational speed of the roller cage engagement assembly 44 relative to the input shaft 20. Specifically, when the input shaft 20 begins to counter-rotate, both the input shaft 20 and the inner race 52 rotate at the same angular speed such that, without the biasing assembly of the present invention, the inner race of a typical two-way clutch would eventually engage the outer race after traversing the typical 4 to 5 degrees of angular distance between the narrowed cam engagement area 64 of the forward direction to the narrowed cam engagement area 64 in the reverse direction. However, the biasing assembly of the present invention, through the mechanical advantage of rotating the roller cage engagement assembly 44 through the planetary gear set assembly 50, causes the roller cage engagement assembly 44, and thereby the rollers 56 to rapidly traverse the 4 to 5 degree angular distance that exists from the narrowing cam area 64 of the forward engagement to the narrowing cam area 64 of the reverse engagement. Therefore, the rollers 56 are moved from a forward engagement to a reverse engagement almost instantaneously instead of having to wait for the input shaft 20 and inner race 52 to traverse 4 to 5 degrees of angular rotation. This then allows the two-way clutch assembly 42 to lock the races 52, 54 in the reverse direction, which is the above described, locked and engaged mode.

It should be appreciated that the above-discussed mechanical advantage of the biasing assembly of the present invention may be varied through changes in the gear ratio of the planetary gear set assembly 50 of the present invention, which would vary the speed at which the angular distance between the forward engagement and the reverse engagement is traversed by the roller cage engagement assembly 44.

In should be further appreciated that the biasing assembly of the present invention also functions as a speed multiplier through its mechanical advantage when the transfer case reengages the drive sprocket 34 in the same direction as it was previously rotating. In other words, if the input shaft 20 has stopped turning or slowed and the outer race 54 of the two-way clutch assembly 42, and thereby the drive sprocket 34, freewheels (as in a coasting situation), the same rapid angular transient movement from the median non-engaged, freewheeling position of the roller cage engagement assembly 44 to the locked and engaged mode occurs if the input shaft 20 then begins to rotate in the same direction.

Figure 5:
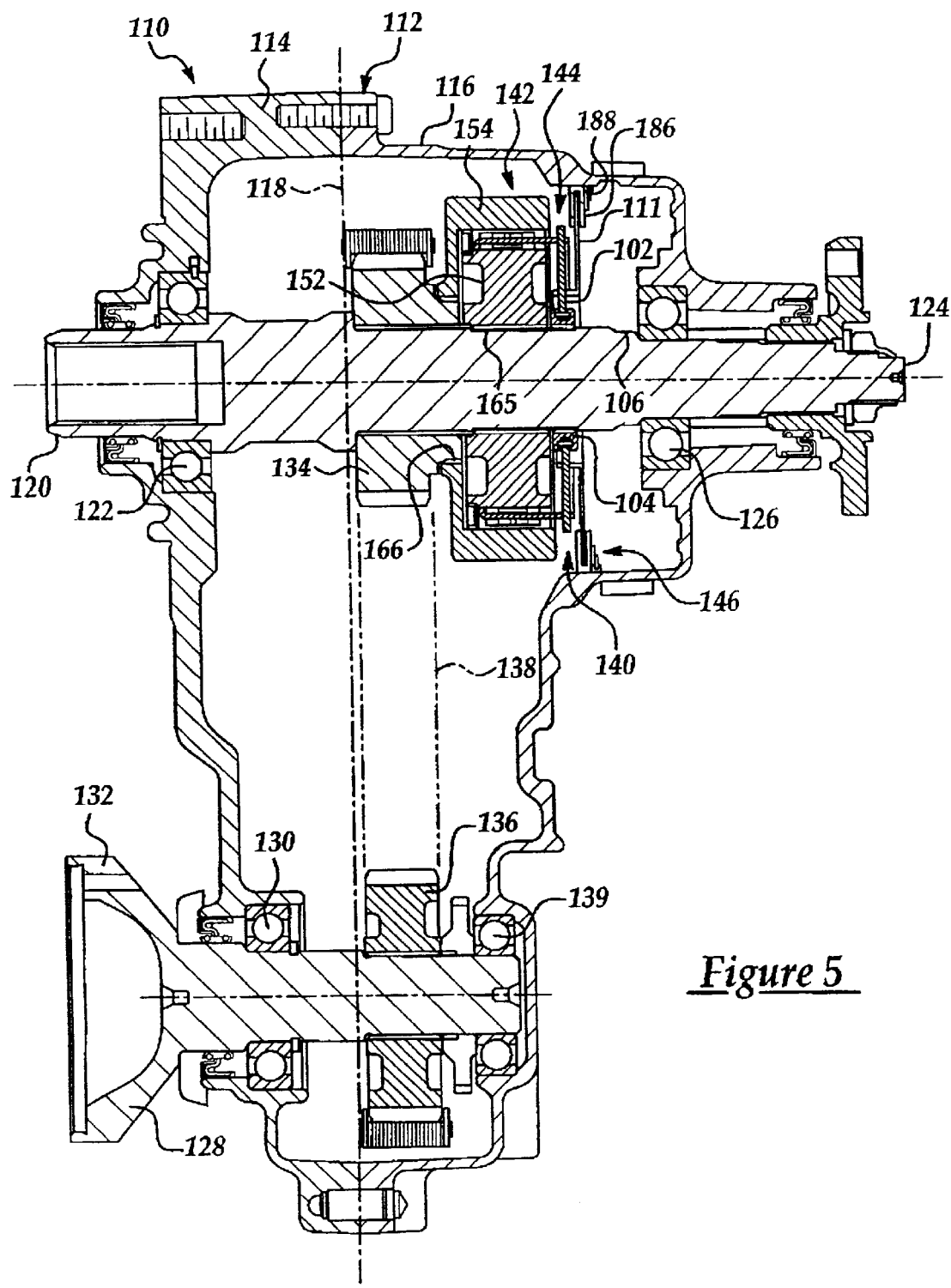
FIG. 5 is a cross-sectional view of a transfer case having a two-way clutch biasing assembly of the present invention utilizing a lever arm actuating arrangement.
Figure 7:
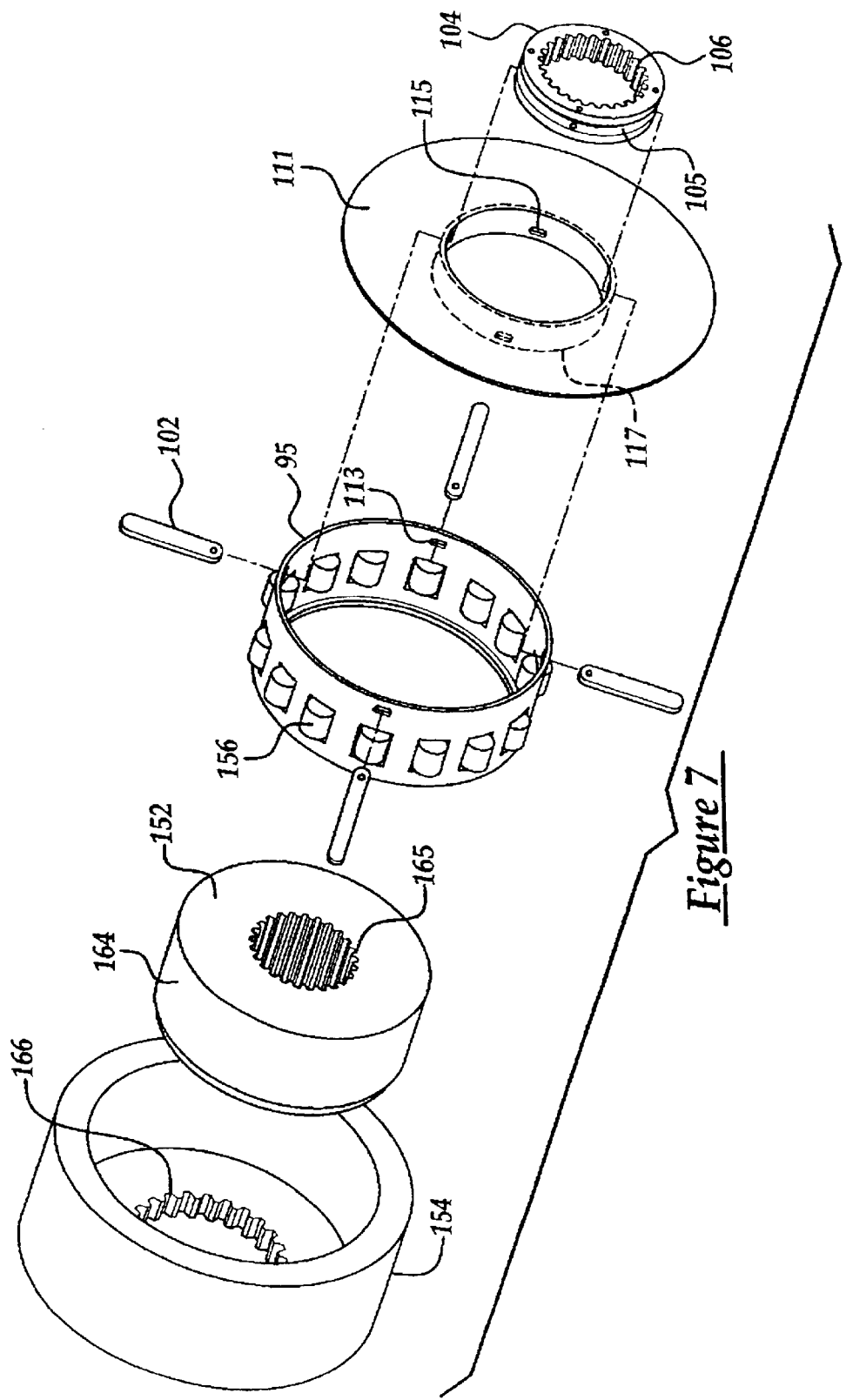
FIG. 7 is an exploded view of a two-way clutch biasing assembly of the present invention utilizing a lever arm actuating arrangement.
Figure 8:
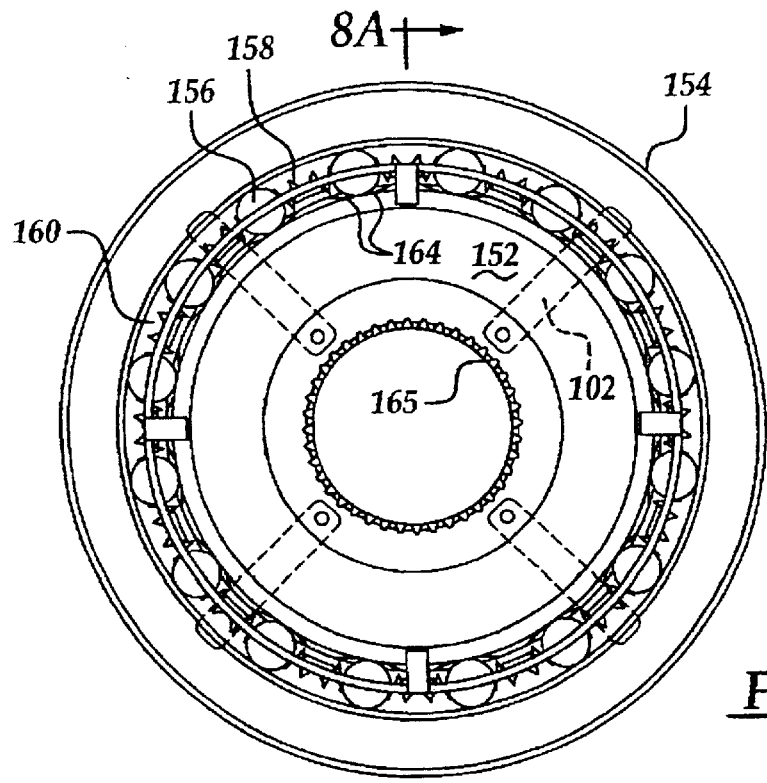
FIG. 8 is an end view of a two-way clutch of the present invention to be used in a two-way clutch biasing assembly with a lever arm actuating arrangement.
Figure 8A:
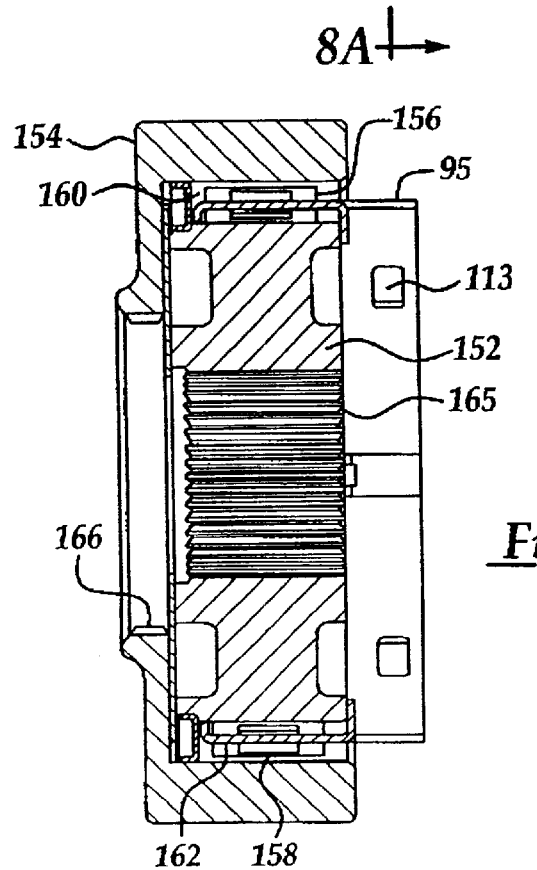
FIG. 8A is a partial cross-sectional view of a two-way clutch of the present invention to be used in a two-way clutch biasing assembly with a lever arm actuating arrangement.

In another non-limiting embodiment, as depicted in FIGS. 5 through 8A, a biasing assembly with a lever arm actuating movement as opposed to a planetary gear set assembly is employed. As shown in FIG. 5, a transfer case is generally indicated at 110 where like numerals are employed to designate like structure throughout the figures. In this embodiment, numerals indicating similar structure as to the first embodiment have been incremented by 154, as such; structural descriptions that are repetitive will not be duplicated here. In reference to this embodiment, FIG. 5 shows a two-way clutch biasing assembly of the present invention, generally indicated at 140 where like numerals are employed to designate like structure throughout the figures. As in the simplified schematic of FIG. 6, the two-way clutch biasing assembly 140 of the present invention includes a two-way clutch assembly generally indicated at 142, a roller cage engagement assembly generally indicated at 144, and a drag clutch assembly generally indicated at 146. As best illustrated in FIGS. 8 and 8A, the two-way clutch assembly 142 is of a roller type, which includes an inner race 152, an outer race 154, and the roller cage engagement assembly 144. The inner race 152 is disposed within the outer race 154 and a circumferential gap 160 is created between the two.

As also shown in the exploded view of FIG. 7, the roller cage engagement assembly 144 includes a main body formed as an open annular ring 95, a plurality of lever arms 102, a lever arm retaining ring 104, a plurality of lever arm pins 108, and a fulcrum disk 111. A portion of the annular ring 95 of the roller cage engagement assembly 144 is interposed in the circumferential gap 160, which is formed between the outer diameter of the inner race 152 and the inner diameter of the outer race 154. The portion of the annular ring 95 that is interposed in the circumferential gap 160 includes a plurality of rollers 156 and a plurality of spring retainers 158. This portion of the annular ring 95 includes a plurality of longitudinally formed roller openings 162 disposed about its circumference. Each one of the plurality of rollers 156 are operatively disposed within each one of the roller openings 162 with each one of the plurality of spring retainers 158 operatively disposed between the rollers 156. The spring retainers 158 provide an equalizing spring pressure between each of the rollers 156. The spring retainers 158 provide an equalizing spring pressure between each of the rollers 156, causing the rollers 156 to be equilaterally spaced within the plurality of roller openings 162. In this manner, the rollers 156 are free to rotate as they rest between the inner and outer races 152 and 154 but are "caged' within the roller cage engagement assembly 144 and are spaced in a free-floating manner by the spring retainers 158. The portion of the annular ring 95 that extends laterally beyond the circumferential gap 60 includes a plurality of lever arm openings 113.

As also shown in FIGS. 6, 7, 8, and 8A, each of the plurality of lever arm openings 113 disposed about the annular ring 95 receive the outer ends of each of the plurality of lever arms 102. The outer ends of the plurality of lever arms 102 are not fixedly disposed in the lever arm openings 113. The plurality of lever arms 102 are also routed through openings in the fulcrum disk (to be described in greater detail below) to the lever arm retaining ring 104, which is fixedly disposed upon the input shaft 120 by a splined connection at 106. The lever arm retaining ring 104 is circumferentially grooved at 105 to operatively accept the inner ends of each of the plurality of lever arms 102. Each of the plurality of lever arms 102 are retained in the lever arm retaining ring 104 by a pin 108. The lever arms 102 are thereby secured in the retaining ring 104 but are free to pivot about the pin 108 in an arcuate manner on an axis parallel to the input shaft 120.

The fulcrum disk 111 has an annular ring 117 formed as a sleeve, which is disposed circumferentially about the input shaft 120. The annular ring 117 of the fulcrum disk 111 includes a plurality of lever arm fulcrum openings 115. As mentioned above, the plurality of lever arms 102 pass through, but are not fixed in, the lever arm fulcrum openings 115. The main body 119 of the fulcrum disk 111 extends radially outwardly from the annular ring 117 in a flat disk shape and is slidingly engaged within the drag clutch assembly 146.

The drag clutch assembly 146 is composed of two friction plates 186 and a Belleville tensioning spring 188. The friction plates 186 are a pair of circular rings attached to the body 112 of the transfer case, having the surface of the fulcrum disk 111 set operatively between them. The Belleville spring 88 provides tension to the friction plates 86 and thereby provides rotational drag on the fulcrum disk 111.

Referring to FIG. 8, the inner race 152 has ramped, or cam, areas 164 on its outer diameter, which narrows the circumferential gap 160 on either side of each of the rollers 156. This allows the rollers 156, in the manner of a conventional two-way clutch, to roll up and engage themselves, in a wedging or jamming manner, between the cammed portions 164 and the inner diameter of the outer race 154 when the rotation of the races 152, 154 would cause them to do so. In this manner, the rollers 156 serve to lock the races 152, 154 together as the rollers 156 are caused to move into the narrowing spaces between the races in either a forward or a reverse rotational direction. When the races 152, 154 are not acted upon to be locked together, the spring retainers 158 function to center the plurality of rollers 156 in a median freewheel position between the cammed portions 164.

The inner race 152 is operatively connected, by a splined engagement, to the input shaft 120 at 165. The outer race 154 is operatively coupled, by a splined engagement, to a portion of the drive sprocket 134 at 166. It should be appreciated that the cammed portions of the two-way clutch may be of differing embodiments (i.e. on the outer race, or on both races) without departing from the scope of the claimed invention.

Similarly to the previously described embodiment, the biasing assembly 140 of the present invention operates in two modes. In the first mode (as best shown in simplified FIG. 6), the locked and engaged mode of operation, the input shaft 120 rotates and the rollers 156 wedge in the cammed portion 164 between the races, locking the races 152, 154 together in a combined rotation and causing the drive sprocket 134 to concomitantly rotate through the splined connection at 166. The roller cage engagement assembly 95 and the lever arm retaining ring 104 are traveling at the same rotational speed, thereby, through the lever arms 102, the fulcrum disk 111 is also traveling at that speed. As such, the drag clutch assembly 146 is allowing the fulcrum disk 111 to slip continuously. If the input shaft 120 has cause to slow or stop, the rollers 156 will back out of the cammed portions 164 to a neutral position that allows the races 152, 154 to unlock and the drive sprocket 134 to freewheel. When the input shaft 120 speeds up faster than the outer race 154 and the drive sprocket 134, the rollers 156 will re-engage the cammed portions 164. In this manner, the two-way clutch 142 avoids the engine braking effect previously discussed.

The second operational mode of this embodiment is also the transient, or translational mode. As above, when the vehicle is in 4WD and the operator selects reverse, the transfer case 110 will reverse the rotation of the input and output shafts, which must also translate to a reversal of the front wheel driveline components in the transfer case 110. Therefore, the two-way clutch 142 must move from an engagement in its forward rotational direction to an engagement in the reverse (or opposite) rotational direction. The biasing assembly 140 of the present invention acts as a speed multiplier to move the roller cage engagement assembly 95 from the locked position of the first rotational direction to the locked position of the opposite rotational direction at a higher rate of speed than would be possible unassisted. However, the biasing assembly 140 of this embodiment uses a lever action to create a mechanical advantage for rapidly moving the roller cage engagement assembly 95 to reduce the mechanical backlash of the two-way clutch.

This second mode of operation is accomplished in the following progression: first, as the vehicle is shifted out of the forward gear, the transfer case input shaft 120 stops allowing the rollers 156 to move slightly back out of their wedged engagement between the races 152, 154. By this action of the two-way clutch 142, the drive sprocket 134 (and the associated front wheel driveline components) may freewheel. At this point, since there is no torque being transferred from the inner race 152 to the outer race 154, the friction loading of the Belleville spring 188 causes the drag clutch assembly 146 to hold and lock the fulcrum disk 111 in place. Next, as the input shaft 120 begins to counter-rotate (reverse), the lever arm retainer ring 104 also rotates, but the fulcrum disk 111 is held stationary. Thus, a "levering action" of the lever arms 102 causes roller cage engagement assembly 95 to rapidly move from its forward engagement to its reverse engagement. This occurs as the lever arm retaining ring 104 moves the inner ends of the lever arms 102 through their pinned (108) attachment. Since the fulcrum disk 111 is stationary, the lever arms are pivoted about the fulcrum points created by the lever arm fulcrum openings 115 in the fulcrum disk 111. Thus resulting in the outer ends of the lever arms 102 acting in a "levering action" on the lever arm openings 113 in the roller cage engagement assembly 95 to traverse the roller cage engagement assembly 95 through the angular distance from the forward engagement cammed portion 164 to the reverse direction engagement. This locks the races for opposite direction rotation and returns us to the first locked and engaged mode, as described above, but in the reverse direction.

Importantly, the "levering action" of the lever arms 102 as applied to the roller cage engagement assembly 95 forms an inherent angular mechanical advantage. This mechanical advantage operates as a speed multiplier in regards to the rotational speed of the roller cage engagement assembly 95 relative to the input shaft 120. Specifically, when the input shaft 120 begins counter-rotating, both the input shaft 120 and the inner race 152 rotate at the same angular speed such that, without the biasing assembly of the present invention, the inner race of a typical two-way clutch would eventually engage the outer race after traversing the typical 4 to 5 degrees of angular distance between the cammed portion 164 of the forward direction to the cammed portion 164 in the reverse direction. However, the biasing assembly of the present invention, through the mechanical advantage of rotating the roller cage engagement assembly 95 through the "levering action" of the lever arms 102, causes the roller cage engagement assembly 95, and thereby the rollers 156, to rapidly traverse the 4 to 5 degree angular distance that exists from the cammed portion 164 of the forward engagement to the cammed portion 164 of the reverse engagement. Therefore, the rollers 156 are moved from a forward engagement to a reverse engagement almost instantaneously instead of having to wait for the input shaft 120 and inner race 152 to traverse 4 to 5 degrees of angular rotation. This then allows the two-way clutch assembly 142 to lock the races 152, 154 in the reverse direction, which is the above described locked and engaged mode.

It should be appreciated that the above-discussed mechanical advantage of the biasing assembly of the present invention may be varied through changes in the physical radial size of the annular ring portion 117 of the fulcrum disk 111 which would vary the placement of the fulcrum points 115 and levering advantage of the lever arms 102, and thereby vary the speed at which the angular distance between the forward engagement and the reverse engagement is traversed by the roller cage engagement assembly 95.

In should be further appreciated that the biasing assembly of the present invention also functions as a speed multiplier through its mechanical advantage when the transfer case reengages the drive sprocket 134 in the same direction as it was previously rotating. In other words, if the input shaft 120 has stopped turning or slowed and the outer race 152 of the two-way clutch assembly 142, and thereby the drive sprocket 134 freewheels (as in a coasting situation), the same rapid angular transient movement from the median non-engaged, freewheeling position of the roller cage engagement assembly 95 to the locked and engaged mode occurs if the input shaft 120 then begins to rotate in the same direction.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A two-way clutch biasing assembly comprising:
a two-way clutch having an inner race operatively attached to an input shaft and an outer race operatively attached to an output shaft;
an engagement assembly operatively interposed between said inner and said outer races of said two-way clutch adapted to rotate bi-directionally to provide selectable mechanical engagement between said races;
a planetary gear assembly having a ring gear, a plurality of planetary gears operatively connected to a carrier, and a sun gear that is operatively connected to said engagement assembly, said planetary gear assembly adapted to operatively rotate said engagement assembly within said two-way clutch; and
a drag clutch assembly operatively connected to said carrier of said planetary gear assembly, said drag clutch adapted to provide a mechanical force to hold said carrier when said input shaft is stationary, such that said sun gear is rotated by said plurality of planetary gears, said sun gear rotating said engagement assembly between said races of said two-way clutch so as to provide a mechanical advantage in engaging said races when the input shaft begins to move.

2. A two-way clutch biasing assembly as set forth in claim 1 wherein said inner race of said two-way clutch is operatively connected to an input shaft within a four-wheel drive transfer case and said outer race of said two-way clutch is operatively connected to a front wheel drive assembly within a four wheel drive transfer case such that when said engagement assembly of said two-way clutch engages said inner race to said outer race, said two-way clutch is adapted to provide motive force to the front wheels of a four wheel drive vehicle.

3. A two-way clutch biasing assembly as set forth in claim 1 wherein said inner and outer races of said two-way clutch have inner cammed portions between them that are operatively formed to create inner cammed portions in both rotational directions, such that said two-way clutch is adapted to engage said inner race to said outer race together in either rotational direction.

4. A two-way clutch biasing assembly as set forth in claim 3 wherein said engagement assembly includes a plurality of rollers which are disposed within a plurality of roller openings which allows said rollers to rotate within a circumferential gap between said inner and said outer races of said two-way clutch.

5. A two-way clutch biasing assembly as set forth in claim 4 wherein said plurality of rollers are equilaterally spaced within said plurality of roller openings by a plurality of spring retainers adapted to normally center said plurality of rollers between said inner cammed portions of said two-way clutch until said inner race is rotatively acted upon by said input shaft.

6. A two-way clutch biasing assembly as set forth in claim 1 wherein said ring gear of said planetary gear set assembly includes an annular ring portion having a plurality of gear teeth disposed on its inner surface which are meshingly engaged to said plurality of planetary gears and are adapted to meshingly engage said sun gear.

7. A two-way clutch biasing assembly as set forth in claim 6 wherein said sun gear of said planetary gear set assembly is operatively formed about the outer circumference of an annular ring portion of said engagement assembly such that any rotation operatively imparted to said sun gear by said planetary gear set assembly operatively rotates said engagement assembly within said two-way clutch.

8. A two-way clutch biasing assembly as set forth in claim 1 wherein said plurality of planetary gears are disposed on pinions, which are fixedly disposed upon said carrier, said plurality of planetary gears operative to rotate on said pinions.

9. A two-way clutch biasing assembly as set forth in claim 1 wherein said drag clutch includes friction plates and a Belleville spring, said friction plates fixedly disposed to the housing of a transfer case and slidingly engaged about the outer edge of the surface of said carrier, said Belleville spring compressively disposed between said friction plates and housing of transfer case and adapted to provide spring tension to said friction plates thereby applying rotational drag to the surface of said carrier and hold said carrier stationary when either said planetary gear set assembly is stationary or said two-way clutch is disengaged.

10. A two-way clutch biasing assembly as set forth in claim 3 wherein said ring gear of said planetary gear set assembly is fixedly connected to the input shaft of a four wheel drive transfer case such that when the input shaft is stationary and said drag clutch assembly frictionally holds said carrier disk, initial rotation of input shaft causes said ring gear to rotate said plurality of planetary gears about their pinions, said rotation translated through said plurality of planetary gears to sun gear of said engagement assembly, thereby causing said engagement assembly to rapidly rotate and engage said rollers in said inner cammed portions of said two-way clutch operatively locking said inner race to said outer race biasing assembly while removing backlash within said clutch.

11. A transfer case having a two-way clutch biasing assembly comprising:

a two-way clutch having an inner race operatively attached to an input shaft of said transfer case and an outer race operatively attached to a drive sprocket of said transfer case;

an engagement assembly operatively interposed between said inner and said outer races of said two-way clutch adapted to rotate bi-directionally to provide mechanical engagement between said races;

a planetary gear assembly having a ring gear, a plurality of planetary gears operatively connected to a carrier, and a sun gear that is operatively connected to said engagement assembly, said planetary gear assembly adapted to operatively rotate said engagement assembly within said two-way clutch; and a drag clutch assembly operatively connected to said carrier of said planetary gear assembly, said drag clutch adapted to provide a mechanical force to hold said carrier when said input shaft is stationary, such that said sun gear is rotated by said plurality of planetary gears, said sun gear rotating said engagement assembly between said races of said two-way clutch so as to provide a mechanical advantage in engaging said races when the input shaft begins to move.

* * * * *